United States Patent [19]

Bottoms

[11] 4,429,941
[45] Feb. 7, 1984

[54] CABLE CLAMPING ARRANGEMENT FOR AN ELECTRICAL CONNECTOR

[75] Inventor: Norman Bottoms, Wilmslow, England

[73] Assignee: International Computers Limited, London, England

[21] Appl. No.: 255,098

[22] Filed: Apr. 17, 1981

[30] Foreign Application Priority Data

May 6, 1980 [GB] United Kingdom ............... 8015043
Aug. 12, 1980 [GB] United Kingdom ............... 8026233

[51] Int. Cl.³ .......................................... H01R 13/58
[52] U.S. Cl. ............................................. 339/103 M
[58] Field of Search ........................ 339/103 R–107; 140/93 A

[56] References Cited

U.S. PATENT DOCUMENTS 3,624,270  11/1971  Turner ............................ 339/105
3,671,921   6/1972  Baker et al. ................ 339/103 M X
3,936,129   2/1976  Guy ............................... 339/103 R
4,160,572   7/1979  Adelburger et al. ..... 339/103 M X
4,256,360   3/1981  Debaigt ......................... 339/107 X

FOREIGN PATENT DOCUMENTS 2436298  2/1976  Fed. Rep. of Germany ...... 339/107

Primary Examiner—Eugene F. Desmond
Attorney, Agent, or Firm—Hane, Roberts, Spiecens & Cohen

[57] ABSTRACT

A cable clamping arrangement (2) for an electrical connector arranged to hold a cable or bundle of wires (7) firmly in place so as to provide strain relief to the wire terminations. In the described embodiment the cable (7) is clamped by being urged into a pair of V-notches (5) formed in a hollow member (3). In one form of the device a flexible tie (8), extending through the interior of the hollow member (3), pulls the cable (7) into the V-notches (5). In other forms of the device the cable (7) is pulled into the V-notches (5) by a rigid hook (11) also extending through the interior of the hollow member (3).

3 Claims, 5 Drawing Figures

CABLE CLAMPING ARRANGEMENT FOR AN ELECTRICAL CONNECTOR

This invention relates to a cable clamping arrangement for an electrical connector, arranged to hold a cable or bundle of wires firmly in place so as to provide strain relief to the wire termination.

SUMMARY OF THE INVENTION

According to the invention there is provided a cable clamping arrangement for an electrical connector including; a pair of spaced apart members each having a first end and a second end opposite said first end; a V-shaped notch in each of the members, the notches being aligned with one another and having their wider ends respectively at the first end of each said member; and means extending between the members for urging a cable into the notches so as to clamp it therein.

In one form of the invention, the means for urging the cable into the notches includes a flexible tie member. In other forms of the invention the means for urging the cable into the notches includes a rigid hook.

BRIEF DESCRIPTION OF THE DRAWINGS

Embodiments of the invention will now be described with reference to the accompanying drawings of which.

DESCRIPTION OF THE PARTICULAR EMBODIMENTS

Figure 1:
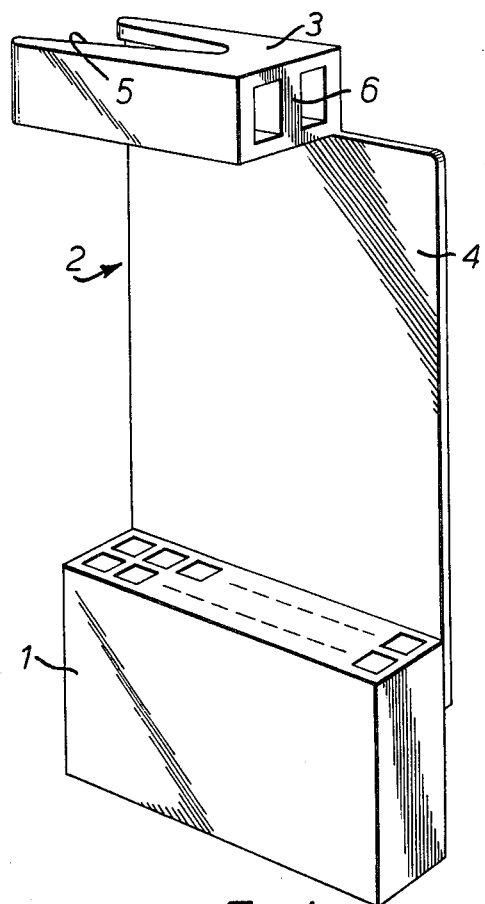
FIG. 1 shows a connector with a cable clamp in accordance with the invention.

FIG. 1 shows an electrical connector, comprising a plastic connector block 1 which may be of known form. The connector has a cable clamp 2 comprising a structure 3 of hollow cross-section, with an integral support arm 4. The clamp 2 may be formed integrally with the connector block 1, or may be formed separately (e.g. as a plastic injection moulding) and secured to the connector block by some suitable means such as ultrasonic welding, snap-acting studs, or screws.

The structure 3 has two longitudinally extending V-shaped notches 5 at one end. (Only one of the notches is visible in the drawing, the other being on the lower face of the structure 3). The structure 3 also has a transverse post 6 at the opposite end to the notches 5.

Figure 2:
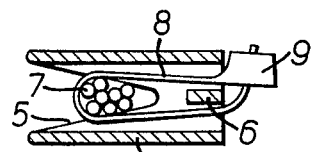
FIG. 2 is a sectional plan view of the clamp, showing a cable secured in position.

As shown in FIG. 2, in use, a bundle of wires 7 from the connector block is located in the notches 5, and a flexible cable tie 8 (which may be of known form) is threaded through the interior of the structure 3, around the wires 7, and around the post 6. The cable tie is tightened and secured so as to pull the wires 7 into the notch 5, thereby clamping them firmly in place.

Figure 3:
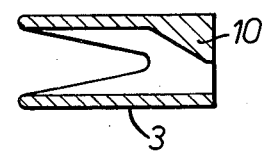
FIGS. 3-5 are sectional plan views of three modified forms of clamp.

Referring now to FIG. 3, in a modification of the clamp shown in FIGS. 1 and 2, the post 6 is dispensed with and, instead, the structure 3 is provided with a constriction 10, sufficiently narrow to prevent the head 9 of the cable tie 8 from passing through.

Figure 4:
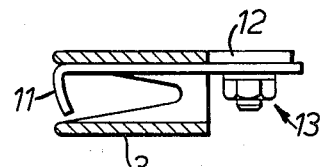

Referring now to FIG. 4, in another modification, the cable tie is replaced by a metal hook 11 which is secured to an extension 12 of the structure 3 by means of a screw, nut and washer 13. The screw passes through an elongated hole (not visible) in the hook 11, allowing the hook to be slid longitudinally so as to pull the cable into the notches, the hook then being secured in place by tightening the nut.

Figure 5:
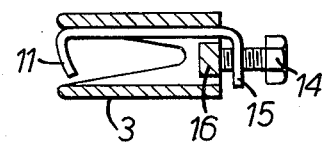

Referring now to FIG. 5, in a modification of the arrangement shown in FIG. 4, longitudinal movement of the hook 11 is produced by means of an adjustment screw 14 which passes through a threaded hole in a bent-over end portion 15 of the hook and bears against a transverse post 16 formed integrally with the structure 3.

It will be appreciated that, although the described embodiment shows a structure of hollow cross-section in which the V-shaped notches are formed, the invention need not be limited to this precise construction. As the essential requirement is that the notches are aligned in spaced relationship, they could be formed in any two spaced apart members, for example a pair of webs integrally formed with the connector.

I claim:

1. A cable clamping arrangement including; a structure of hollow cross-section having a pair of spaced apart opposite sides, each side having a first end and a second end opposite said first end; an acute angled V-shaped notch in each of the opposite sides, the notches being aligned with one another and having their respective wider ends at the first end of each side; and means extending through the hollow structure in a direction away from the first ends for engaging the cable and urging it into the notches so as to wedge it therein and thereby clamp it to the structure, the means including a flexible tie extending around the cable and a constriction in the interior of the hollow structure effective to secure the tie.

2. A cable clamping arrangement including; a structure of hollow cross-section having a pair of spaced apart opposite sides, each side having a first end and a second end opposite said first end; an acute angled V-shaped notch in each of the opposite sides, the notches being aligned with one another and having their respective wider ends at the first end of each side; and means extending through the hollow structure in a direction away from the first ends for engaging the cable and urging it into the notches so as to wedge it therein and thereby clamp it to the structure, the means including a rigid hook engaging the cable and being adjustable to bring the cable into engagement with the notches.

3. A cable clamping arrangement as claimed in claim 2, in which adjustment of the hook is provided by an adjustment screw co-operating with a threaded hole in a portion of the hook and bearing against an integrally formed part of the arrangement.

* * * * *